Aug. 4, 1964
B. L. PALMER
3,143,002
PEDAL DEPRESSERS FOR VEHICLE BRAKES
Filed July 11, 1962
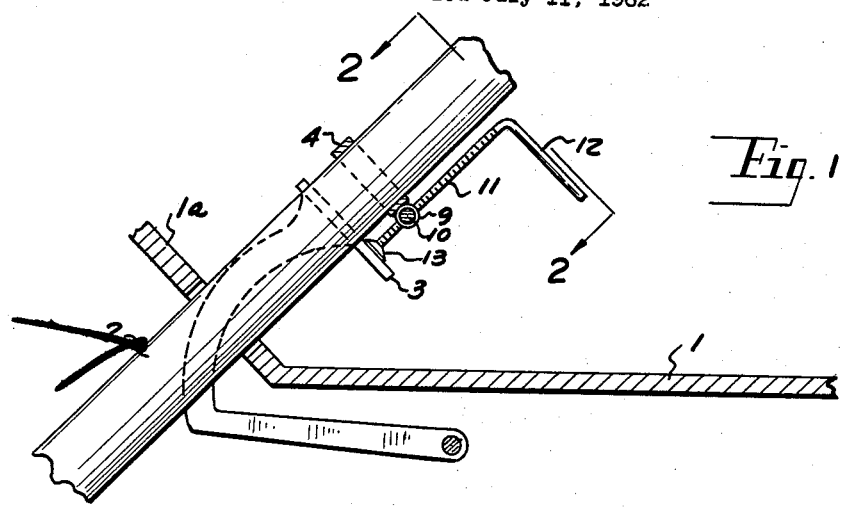
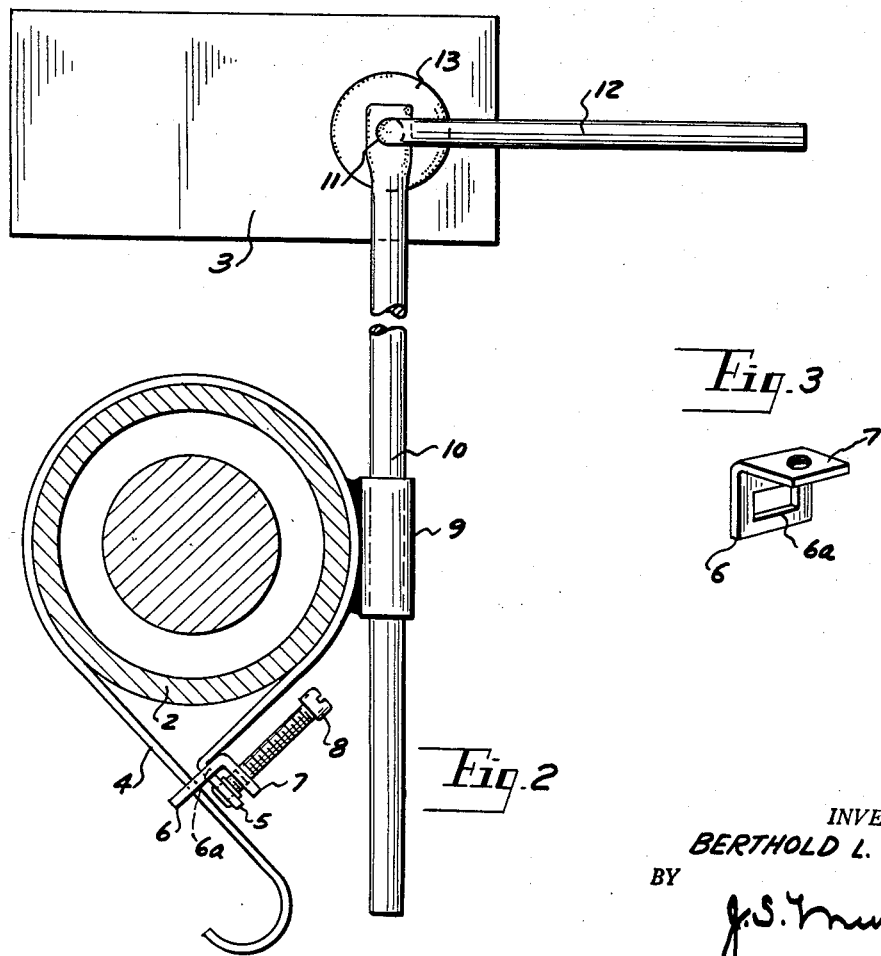
INVENTOR.
BERTHOLD L. PALMER
BY
J. S. Murray
ATTORNEY United States Patent Office 3,143,002
Patented Aug. 4, 1964

3,143,002
PEDAL DEPRESSERS FOR VEHICLE BRAKES
Berthold L. Palmer, 28400 Ryan Road, Warren, Mich.
Filed July 11, 1962, Ser. No. 209,124
1 Claim. (Cl. 74—532)

This invention relates to vehicle brake mechanisms and more particularly brake pedal depressing attachments for vehicle brakes.

When a jack is applied to a vehicle to relieve one or more of the wheels of load, it is desirable to maintain an applied position of the brakes, since any tendency of the jack to slip or tilt will thus be largely overcome.

In preparing to remove or replace a vehicle wheel, it is also desirable to maintain an application of the brakes, so that torque applied to the nuts which normally hold the wheel in place will not subject the wheel to rotation, rather than taking effect successively on the nuts.

If it is necessary to park a car on a surface having considerable incline, it may be desirable to maintain such a locking of the brakes, as will safeguard the car against rolling down the incline.

To obtain results similar to those above discussed, it has been proposed to mechanically retain the brake pedal in its depressed position, but such proposed mechanisms are unduly complex, cumbersome, and expensive.

Objects of the present invention are to provide a simple and relatively inexpensive mechanism for maintaining depression of a brake pedal, when desired; to render such mechanism so compact that it may be stored in the usual glove compartment; and to afford such mechanism adjustments suiting it for use on a great variety of makes and sizes of motor vehicles.

These and various other objects are attained by the construction hereinafter described and illustrated in the accompanying drawing, wherein:

FIG. 1 is a fragmentary elevational view, in partial section, of my attachment applied to a vehicle.

FIG. 2 is a fragmentary view, in partial cross-section taken on the line 2—2 of FIG. 1, further showing the applied attachment.

FIG. 3 is a perspective view of a coupling employed in the attachment.

In these views, the reference characters 1 and 1a designate the usual floor and foot board of a motor vehicle equipped with the usual steering column 2 and pivotal pedal 3, the latter controlling any desired brake mechanism (not shown). To install my attachment, a collar 4 is applied to the steering column at a selective height suited to use of said attachment. Such collar is formed preferably by a highly flexible sheet metal ribbon having one of its end portions outwardly bent to form a thrust element 5. A coupling for interconnecting said end portions integrally forms a pair of relatively transverse lugs 6 and 7, the lug 6 being slotted at 6a to receive and slidingly retain the other end portion of the ribbon. The lug 7 of said coupling serves as a nut threaded to receive a bolt 8 for clamping the thrust element 5 against the other (or sliding) end portion of the ribbon to maintain a selective size of the collar.

Rigidly and exteriorly mounted on the described collar, as by welding, is a sleeve 9 elongated transversely to the collar axis, and a rod 10 is slidable and rotative in said sleeve. One end of said rod is apertured and threaded to receive an elongated screw 11 extending transversely to the rod. An end portion 12 of said screw is bent transversely to the threaded length of screw, affording a rotary actuation of the latter. The other end of the screw rotatively mounts a disk 13 adapted to seat upon and suitably depress the pedal 3.

In different makes and sizes of vehicles, there is considerable variation in the diameter of the steering column, and my attachment may be readily adapted to any such variation by simply expanding or contracting the collar 4 to any necessary extent. Also the collar, preliminary to fixing same on the steering column, may be slid up or down on the column, if this is rendered necessary by the relative location of the column and brake pedal. Adaptability of the rod 10 to slide lengthwise in the sleeve 9 is also an important feature in assuring that the disk 13 will properly seat on the pedal, despite variations of design in different vehicles. Rotatability of the rod 10 in the sleeve is also highly desirable in affording a firm seating of the disk on the pedal, so that thrust exerted by the screw 11 will act in the most effective direction, namely in at least an approximately transverse relation to the pedal.

Adaptability of the screw 11 to rotate independently of the disk 13 permits the disk to cease rotation, after initially seating on the pedal, thus avoiding considerable frictional resistance to subsequent rotation of the screw.

When the described attachment is not in use, its parts 10, 11, 12 and 13 may be readily removed as a unit by simply sliding the rod 10 to release it from the sleeve 9. The collar 4 may then be adjusted on the column 2 to any position where it will not interfere with the usual controls of the vehicle. This permits installation or removal of the attachment with a maximum ease and rapidity.

What I claim is:

An attachment for a vehicle equipped with a steering column and a brake-operating pedal, said attachment comprising a collar embracing said column, means for clamping said collar to the column at selective levels, a sleeve fixed on said collar in an exterior relation to the collar, a rod slidable in said sleeve and formed at one of its ends with a threaded aperture, a screw threaded in said aperture and having a substantially transverse relation to the rod, means on one end of the screw for applying rotation to the screw, and a foot on the other end of the screw for seating on and depressing said pedal, the rod being slidable and rotatable in the sleeve to accommodate the attachment to various installations of the column and pedal encountered in different vehicles, said clamping means including a coupling forming two relatively transverse lugs, one of said lugs having a slot slidably receiving an end portion of the collar, the other end portion of the collar being inserted in said slot, said clamping means further including a clamping bolt threaded in the other of said lugs to thrust said inserted end portion of the collar against said sliding end portion.

References Cited in the file of this patent

UNITED STATES PATENTS

| 1,368,957 | Miller | Feb. 15, 1921 |
| 1,448,912 | Cowdrey | Mar. 20, 1923 |
| 1,769,191 | Russell et al. | July 1, 1930 |
| 2,755,684 | Russell | July 24, 1956 |
| 2,764,438 | Haviland | Sept. 25, 1956 |
| 2,905,423 | Smith et al. | Sept. 22, 1959 |

FOREIGN PATENTS

| 6,392 of 1909 | Great Britain | May 13, 1909 |
| 79,750 | Netherlands | Nov. 15, 1955 |